Aug. 14, 1928.
R. DIETZE
1,680,733
ELECTRICAL SYSTEM AND APPARATUS
Filed Jan. 13, 1927
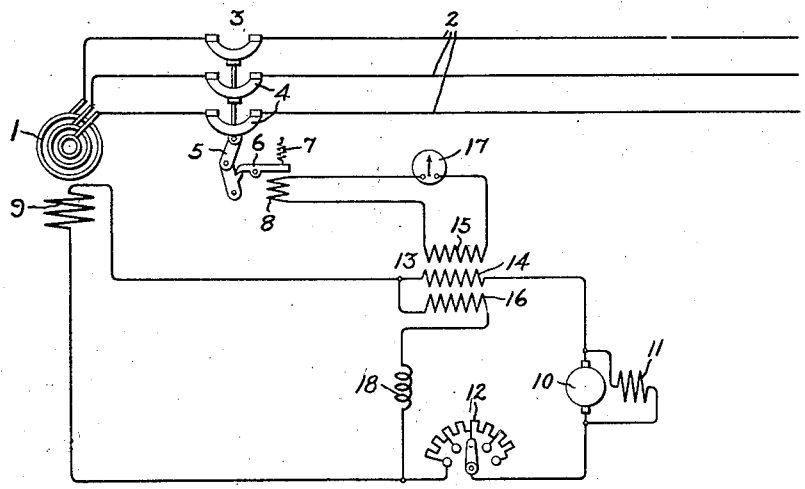
Inventor:
Richard Dietze;
by
His Attorney.

Patented Aug. 14, 1928.

1,680,733

UNITED STATES PATENT OFFICE.

RICHARD DIETZE, OF PANKOW, BERLIN, GERMANY, ASSIGNOR TO GENERAL ELECTRIC COMPANY, A CORPORATION OF NEW YORK.

ELECTRICAL SYSTEM AND APPARATUS.

Application filed January 13, 1927, Serial No. 160,988, and in Germany February 24, 1926.

My invention relates to electrical apparatus which is subjected to composite excitation comprising a direct current and an alternating current component and in particular to apparatus for the protection of the field structure and windings of a dynamo-electric machine supplying a distribution circuit from the injurious effects of the voltage induced in the field structure and windings by the presence of abnormal conditions on the distribution circuit.

My invention is especially applicable to the protection of the field structure and windings of a polyphase alternating current generator from the injurious effects of operating the polyphase generator with the phases badly unbalanced as may be the case when a single phase load is being supplied from the generator. When the phases are unbalanced, a voltage of double the normal frequency is induced in the field winding, and the more the phases are unbalanced the larger is this induced voltage. This induced voltage may become so large as to break down the insulation of the field winding and produce a short circuit causing serious damage to the field winding. Furthermore, the eddy currents in the field structure caused by this induced alternating voltage may produce excessive and disastrous heating.

It is an object of my invention to provide an improved device for use in circuits energized by direct and alternating currents in which the design and operating characteristics of the device are not unfavorably influenced by direct current energization.

A further object of my invention is to provide an improved means for preventing the field structure and windings of a dynamo-electric machine from being damaged by the occurrence of abnormal conditions on the distribution circuit.

In accordance with the object of my invention, I provide in the field circuit of a dynamo-electric machine an inductive device which is arranged to be responsive to the current produced by the voltage induced in the field circuit by abnormal conditions for rendering the dynamo-electric machine inoperative to supply current to the distribution circuit, and provide the inductive device with means for compensating the direct current magnetization.

The novel features which I believe to be characteristic of my invention are set forth with particularity in the appended claims; the invention itself, however, both as to organization and method of operation, together with further objects and advantages thereof, will best be understood by reference to the following description taken in connection with the accompanying drawing in which the single figure is a diagrammatic view of a polyphase system of distribution showing one embodiment of my invention.

Referring to the drawing, a polyphase current is supplied from a polyphase generator 1 to the polyphase distribution circuit 2 through a switch 3. This switch may be of any well known type. The particular type shown in the drawing consists of contact members 4 which are controlled by a link mechanism 5 which, when operated to close the switch, is arranged to engage a holding latch 6 having a cooperating spring 7 which will hold the switch closed and complete the circuit between the generator 1 and the distribution circuit 2. A tripping coil 8 is arranged when energized a predetermined amount to release the latch 6 and permit switch 3 to move to its circuit interrupting position. The switch may be closed by hand or in any other convenient manner.

The generator 1 is provided with a field winding 9 connected to the direct current exciter 10 which is provided with a field winding 11. I have shown an adjustable resistance 12 connected in series with the generator field circuit so that the exciting current can be readily adjusted to any desired degree or controlled in any well known manner. In the field circuit of the generator I provide a suitable means which is responsive to pulsating or alternating current, but is not affected by continuous current, for rendering the dynamo-electric machine 1 inoperative to supply current to the distribution circuit 2 in case the voltage induced in the field winding of the dynamo-electric machine by abnormal conditions in the distribution circuit exceeds a predetermined value. In the specific embodiment of my invention shown in the drawing this means comprises a transformer 13 having a primary winding 14, a secondary winding 15 and a tertiary winding 16. The primary winding is connected in series relation with the field circuit, and the secondary winding is connected to energize the tripping coil 8.

While I prefer to utilize the tripping coil 8, it will also be apparent that various indicating and measuring devices may be inserted in the circuit to give an alarm or indicate the degree of unbalance, and such an arrangement is diagrammatically indicated by the device 17 which may be used in addition to the tripping coil, if preferred, without departing from my invention in its broader aspects.

In order to preserve an accurate ratio of transformation and minimize the material utilized in the core and windings of the transformer 13, I provide a tertiary winding 16 connected to be responsive to the voltage across the field circuit 9 and associate this tertiary winding with the primary winding 14 to oppose or neutralize the magnetic flux set up by winding 14 due to its direct current energization. This prevents magnetization or saturation of the core by direct current and at the same time permits the use of a transformer with the same design characteristics as though it were to be used in a circuit excited solely by a pulsating or alternating current. In series with the winding 16 I insert an impedance shown as a reactance 18 to prevent energization of the tertiary winding by the alternating current induced in the field circuit so that the transformer functions as a simple transformer of two windings under alternating current conditions.

While I have shown and described the particular embodiment of my invention in a field circuit which is subjected to alternating current superimposed on direct current, it will be obvious that my invention may be used and embodied in other electrical circuits in which it is desired to have a device which is responsive to an alternating component of a composite excitation and unaffected by a direct current component, and it will also be obvious that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an electrical circuit energized by composite excitation comprising a direct and an alternating current component, an inductive device connected in said circuit and having an impedance which permits both of said components of current to flow therethrough with substantially equal facility, and additional means including a winding inductively associated with said inductive device and connected across said circuit in a circuit having an impedance sufficient substantially to prevent a flow of said alternating current component while permitting said direct current component to flow substantially unimpeded therethrough for preventing magnetization of said inductive device by said direct current component.

2. In combination with an electrical circuit energized normally by a continuous current and a superimposed alternating current under predetermined conditions, of an inductive device connected in said circuit to be responsive to the alternating current superimposed upon said continuous current, and means associated with said inductive device and responsive to continuous current energization for preventing magnetization of said inductive device by the continuous current in said circuit.

3. In combination with an electrical circuit normally energized by a continuous current and a superimposed alternating current under predetermined conditions, of a transformer having a primary winding connected in series relation with said circuit, an auxiliary winding on said transformer connected to be responsive to the direct current energization of said circuit and arranged to oppose the magnetic flux produced by said primary winding under direct current energization, and means in series relation with said auxiliary winding for preventing energization thereof by alternating current.

4. In combination, a distribution circuit, a dynamo-electric machine supplying electrical energy thereto, a field circuit for said dynamo-electric machine, a source of direct current excitation therefor, means responsive to the current produced by the voltage induced in the field windings of said machine by abnormal conditions in said distribution circuit for rendering said machine inoperative to supply current to said distribution circuit, and means connected to be responsive to a characteristic of the normal energizing source of said field circuit associated with said first means for preventing any change in the operating characteristics of said first means due to the energization by said source of direct current excitation.

5. In combination, a polyphase distribution circuit, a polyphase generator having a field circuit energized by direct current and supplying electrical energy to said distribution circuit, an inductive device responsive to the electromotive force induced in the field circuit of said generator by the unbalancing of the phases of said distribution circuit for rendering said generator inoperative to supply current to said distribution circuit, and means responsive to a characteristic of the direct current energization for preventing magnetization of said inductive device by the direct current in said field circuit.

6. In combination, a polyphase distribution circuit, a polyphase generator having a field circuit energized by direct current and supplying electrical energy to said distribution circuit, an inductive device connected in the field circuit of said generator, an electroresponsive device connected to said inductive device and arranged to be energized in response to the voltage induced in said field circuit by an unbalancing of the phases of said distribution circuit, and a winding responsive to the direct current voltage of said field circuit for neutralizing the flux produced by the direct current field current flowing through said inductive device.

7. In combination, a polyphase distribution circuit, a polyphase generator having a field circuit energized by direct current and supplying electrical energy to said distribution circuit, a transformer having a primary winding connected in series relation with said field circuit, an electroresponsive device connected to the secondary winding of said transformer and arranged to be operated in response to the voltage induced in said field circuit by unbalancing of the phases of said distribution circuit, a tertiary winding on said transformer energized in response to direct current from said field circuit and arranged to oppose the flux produced by the direct current energization of said primary winding, and an impedance in series relation with said tertiary winding for preventing energization thereof by the current induced in said field winding by unbalancing of the phases of said distribution circuit.

8. In combination, a polyphase distribution circuit, a polyphase generator having a field circuit energized by direct current and supplying electrical energy to said distribution circuit, a switch between said generator and distribution circuit, a transformer having a primary winding connected in series relation with said field circuit, an electroresponsive device connected to the secondary winding of said transformer and arranged to be energized in response to the voltage induced in said field circuit by unbalancing of the phases of said distribution circuit for opening said switch, a tertiary winding on said transformer energized in response to the direct current voltage of said field circuit and arranged to oppose the flux produced by the direct current energization of said primary winding, and a reactance in series with said tertiary winding for preventing energization thereof by the current induced in said field winding by unbalancing of the phases of said distribution circuit.

In witness whereof, I have hereunto set my hand this 23rd day of December, 1926.

RICHARD DIETZE.